United States Patent [19]

Calvert

[11] 4,318,420

[45] Mar. 9, 1982

[54] BALL VALVES

[75] Inventor: Michael A. Calvert, Kirkcaldy, Scotland

[73] Assignee: T. K. Valve Limited, Dunfermline, Scotland

[21] Appl. No.: 192,922

[22] Filed: Oct. 1, 1980

[30] Foreign Application Priority Data

Oct. 4, 1979 [GB] United Kingdom ............... 34459/79

[51] Int. Cl.$^3$ ............................................. F16K 13/04
[52] U.S. Cl. ...................... 137/74; 251/171; 251/174
[58] Field of Search ............... 137/72, 74; 251/171, 251/174

[56] References Cited

U.S. PATENT DOCUMENTS

| | | | |
|---|---|---|---|
| 3,097,823 | 7/1963 | Kaiser | 251/174 X |
| 3,241,808 | 3/1966 | Allen | 251/174 |
| 3,346,234 | 10/1967 | Allen | 251/174 |
| 3,990,465 | 11/1976 | Allen | 137/72 |
| 3,991,974 | 11/1976 | Bonatous | 251/171 X |

*Primary Examiner*—Harold W. Weakley
*Attorney, Agent, or Firm*—Nathaniel A. Humphries

[57] ABSTRACT

A ball valve is provided especially for use between adjacent sections of a pipe line conducting an inflammable fluid and comprises a valve housing, a valve ball (2) in the housing and having a through passage, a trunnion in the housing projecting into a first socket in the ball, and a control shaft projecting into and drivingly engaging a second socket in the ball diametrally opposed to the first socket. A pair of annular valve seat members (4) spaced axially of the pipe line carry sealing rings (8), spring means (9) urging the seat members towards the ball. Each seat member at its end adjacent the spring means has a frusto-conical portion (11) which tapers from a shoulder (12) on the seat member towards the end face (4A) of the latter. A graphite ring (13) is fitted between the frusto-conical portion and the adjacent peripheral wall of the housing and a first spacer ring (14) is located between the graphite ring and the shoulder. Furthermore, an annular pressure plate (15) is located between the end face of the seal member and the spring means and is abutted by the latter and has an annular lip (15A) abutting the graphite ring. Additionally, a second spacer ring (16) is provided between the end face of the seat member and the pressure plates. In the event of fire in the pipe line, the sealing ring and spacer rings disintegrate so that the spring means pushes the seat member.

2 Claims, 10 Drawing Figures

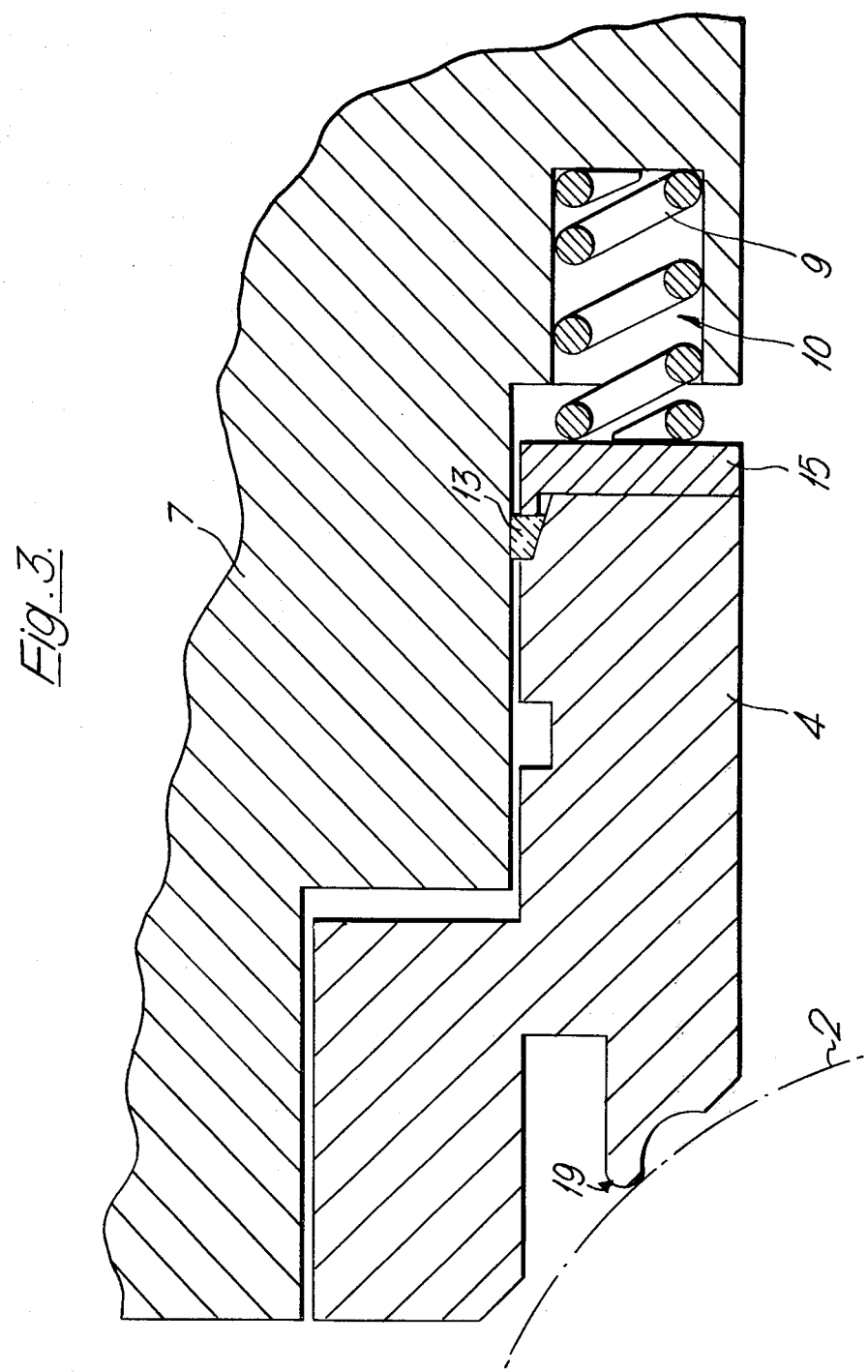

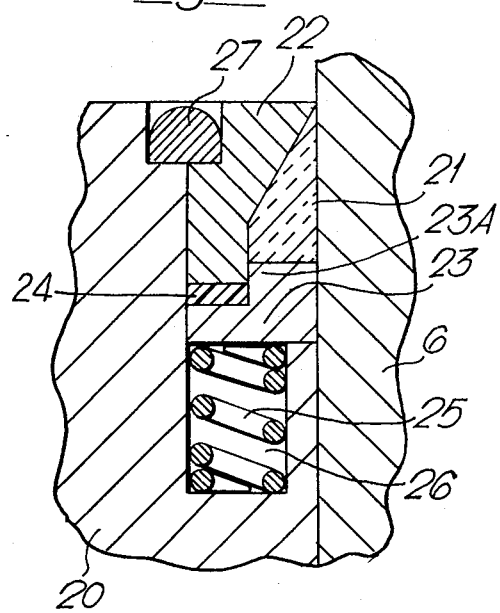
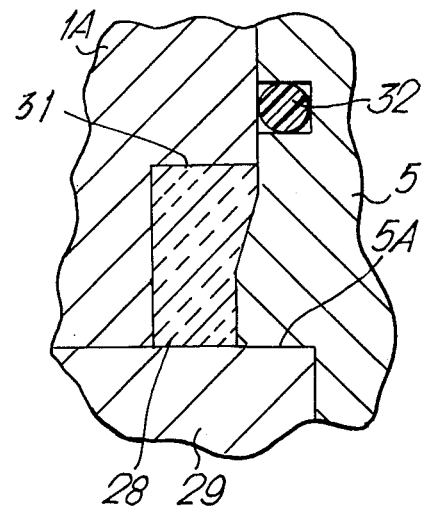
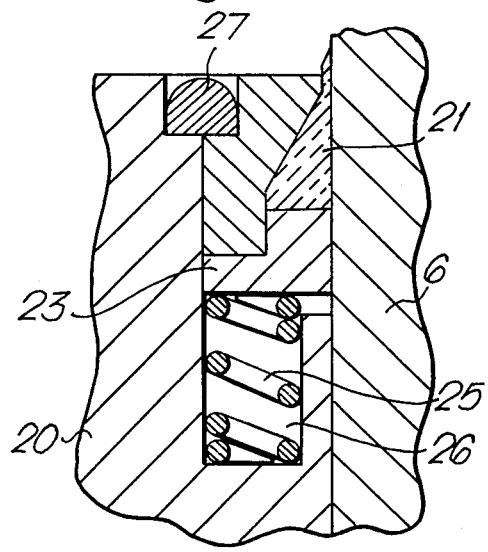
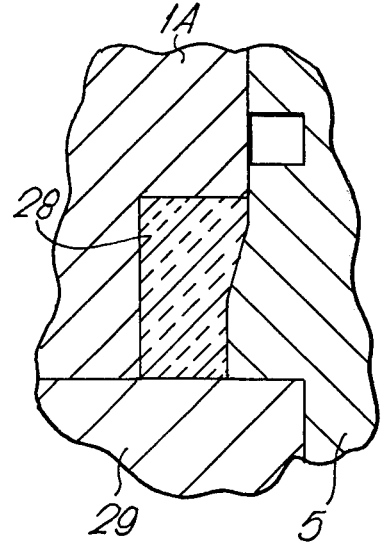

BALL VALVES

This invention relates to ball valves, especially for use between sections of pipe lines conducting inflammable fluids.

A ball valve consists generally of a valve housing, a valve ball in the housing turnable between open and closed positions, pipe connectors or so-called adaptors connected to opposite ends of the housing, and valve seats located in recesses in said adaptors and/or housing and resiliently urged into sealing engagement with the ball. Seals in the form of O-rings are provided between the valve seats and the peripheral walls of said recesses in the adaptors, and the valve seats carry non-metallic, for example nylon, sealing rings in engagement with the ball.

At present, if fire occurs, for example in a section of a pipe line on the upstream side of a ball valve, there is a disadvantage that closure of the valve does not normally prevent the spread of fire to the downstream side. The reason for this is that the said O-rings are destroyed and fluid can flow downstream between said valve seats and the walls of the recesses in the adaptors and/or housing. Moreover, the non-metallic sealing rings are also destroyed, and a further or alternative passage for the fluid results.

An object of the present invention is to provide a ball valve in which said disadvantage is obviated or mitigated.

For convience of description, the term "housing" will hereinafter be assumed to include said adaptors or similar pipe coupling means.

According to the present invention there is provided a ball valve, especially for use between adjacent sections of a pipe line conducting an inflammable fluid, said ball valve comprising a valve housing, a valve ball in said housing and having a through-passage, a trunnion is said housing projecting into a first socket in said ball, a control shaft projecting into and drivingly engaging a second socket in said ball diametrally opposed to said first socket, a pair of annular valve seat members spaced axially of the pipe line and carrying heat-destructible sealing rings, and spring means urging said seat members into sealing engagement with the ball; in which each seat member, at its end adjacent the spring means has a frusto-conical portion which tapers from a shoulder on the seat member towards the end face of the latter, a graphite ring is fitted between said frusto-conical portion and the adjacent peripheral wall of the housing, a first heat-destructible spacer ring is located between said graphite ring and said shoulder, an annular pressure plate is located between the end face of the seat member and the spring means and is abutted by the latter and has an annular lip abutting the graphite ring, and a second heat-destructible spacer ring is provided between the end face of the seat member and said pressure plate; whereby, in the event of fire in a pipe line on the upstream side of the valve, the sealing ring and said spacer rings on the upstream seat member disintegrate, the spring means pushes the seat member into metal-to-metal sealing contact with the ball, and pushes the pressure plate relative to the seat member so that the lip on the pressure plate pushes the graphite ring along the frusto-conical portion towards the shoulder so that the graphite ring becomes tightly wedged between the frusto-conical portion and the adjacent peripheral wall of the housing and seals the clearance passage therebetween against the spread of fire therealong.

It is to be understood that fluid pressure in the pipe line assists the spring means in effecting the aforesaid movements of the seat member and the pressure plate.

An embodiment of the invention will now be described, by way of example, with reference to the accompanying diagrammatic drawings, in which:

FIG. 3 is a view corresponding to FIG. 2 showing the seat member in its condition after the occurrence of a fire;

FIG. 4 is a view of the portion within the ring A in FIG. 1, to a larger scale, and in a pre-fire condition;

FIG. 5 is a view corresponding to FIG. 4, in a post-fire condition,

FIG. 6 is a view of the portion within the ring B in FIG. 1, to a larger scale, and in a pre-fire condition;

FIG. 7 is a view corresponding to FIG. 6, in a post-fire condition;

Ball valves of the kind to which this invention relates are well known and full details of such a valve will therefore not be described herein. Reference may, however, be made to our British Pat. No. 1525193 which discloses the construction of such a valve in detail and an arrangement whereby, in the event of fire within a pipe line, the ball is moved axially of the pipe line by fluid pressure to seal off one side of the valve from the other. In ball valves according to the present invention, however, the ball is not axially displaceable.

Figure 1:
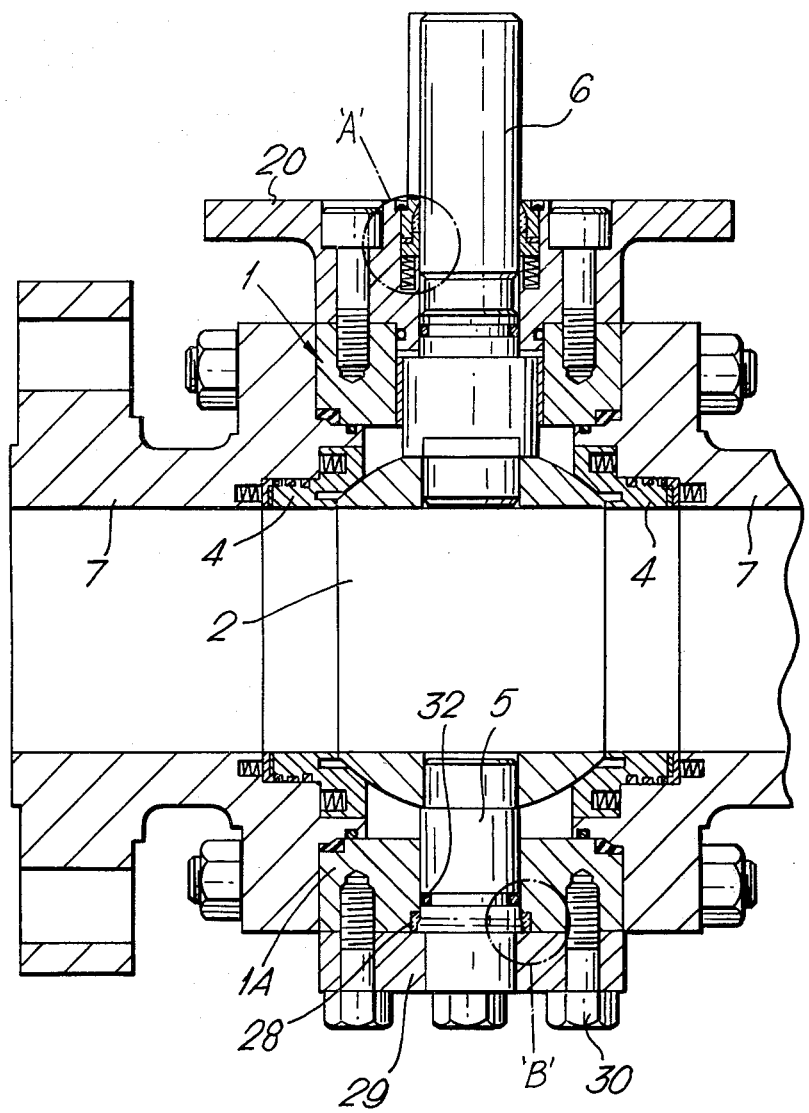
FIG. 1 is a sectional view of a ball valve according to the present invention.

Referring to FIG. 1, a ball valve consists generally of a valve housing 1, a valve ball 2 having a through passage, valve seat members 4 upstream and downstream of the ball 2, a trunnion 5 on which the ball 2 is rotably adjustable, and a control shaft 6 in driving connection with the ball 2 and turnable through gearing or by a wrench. As aforesaid, for convenience of description, it will be assumed that end pipe connectors or so-called adaptors 7 form part of the housing 1.

The valve seat members 4 are identical and the upstream one will now be described with reference to FIG. 2. The valve seat member 4 carries in an annular recess on one end face a sealing ring 8, made of a heat-sensitive material such for example as nylon which abuts the ball 2 and normally prevents the passage of fluid around the ball. The seat member 4 has, on a face axially opposed to the sealing ring 8, spring means in the form of an annular series of compression springs 9 located in socket means in the form of a corresponding series of sockets 10. The springs 9 project from the sockets 10 and urge the seat member 4 into sealing contact with the ball 2 through the intermediary of the sealing ring 8.

At its end adjacent the springs 9, the seat member 4 has a frusto-conical end portion 11 which tapers from a shoulder 12 on the seat member towards the end face 4A of the latter. In the space between the end portion 11 and the adjacent peripheral wall of the adaptor 7, there is fitted a graphite ring 13, preferably of the kind sold under the trade mark "Graphoil", such rings being slightly flexible and compressible. Also in said space, there is located a spacer ring 14 between the ring 13 and the shoulder 12, the ring 14 being made of heat-destructible material, such as nylon.

Between the end face 4A of the seat member and the projecting ends of the springs 9, there is an annular pressure plate 15 against which the springs 9 abut, and, between the plate 15 and the end face 4A, there is a spacer ring 16 made of nylon or other heat-destructible material. The pressure plate 15 has an annular lip of flange 15A which abuts the adjacent end face of the graphite ring 13. In Fig. 2, the numeral 17 indicates a heat-destructible seal in the form of an O-ring.

In the event of fire or excessive heat in the pipe line adjacent the above described adaptor, the sealing ring 8, the O-ring 17, and the spacer rings 14 and 16 disintegrate. The springs 9 push the seat member 4 into metal-to-metal sealing contact with the ball 2, and push the pressure plate 15 relative to the seat member, so that the lip 15A on the plate 12 pushes the graphite ring 13 along the frusto-conical end portion 11 into abutment with the shoulder 12, so that the graphite ring 13 is tightly wedged between the end portion 11 and the adjacent peripheral wall of the adaptor 7 and seals the clearance passage 18 therebetween, against the spread of fire therealong. The action of the springs is, of course, assisted by the fluid pressure in the pipe line.

Figure 2:
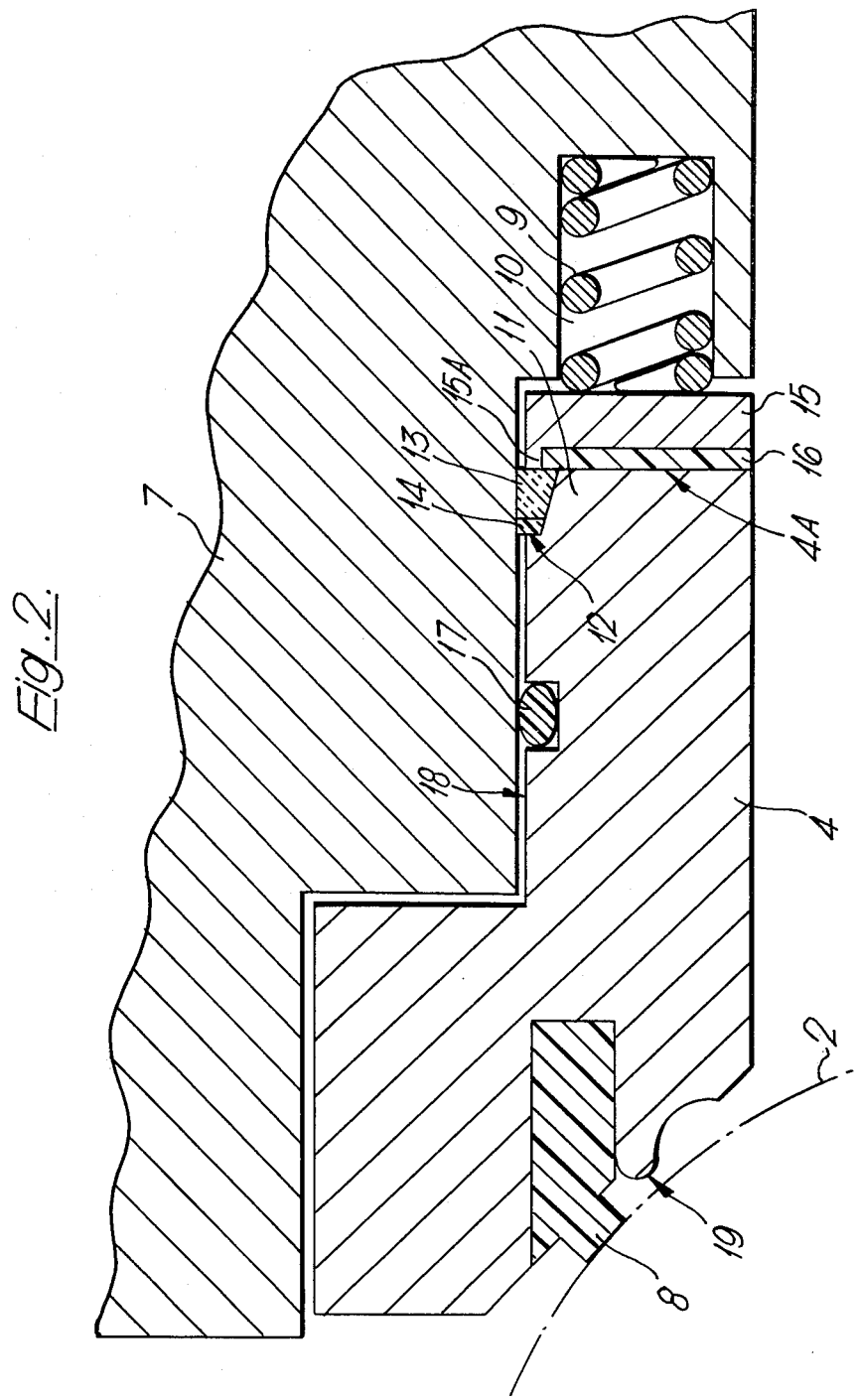
FIG. 2 is a fragmentary sectional view corresponding to FIG. 1, to a larger scale, and showing a seat member in its normal or pre-fire condition.

The post-fire condition of the seat member 4 is shown in FIG. 3, and it will be seen from FIGS. 2 and 3 that the face of the seat member 4 adjacent the ball 2 is provided with a rounded lip 19, around the mouth of the recess for sealing ring 8, for ensuring a tight seal in the FIG. 3 condition.

Sealing means for preventing the escape of fire between the control shaft 6 and the bonnet or closure cap 20 of the valve will now be described with reference to FIGS. 1, 4 and 5.

The sealing means consists generally of a graphite ring 21, a metal packing ring 22, an annular pressure plate 23, and a heat-destructible spacer ring 24, all located in an annular recess in the closure cap 20 and extending around the control shaft 6, and a plurality of springs 25.

The springs 25 are located in sockets 26 in the base of the recess and press against the pressure plate 23, so that the spacer ring 24 is clamped between the pressure plate and the base of the packing ring 22, and an annular boss 23A on the pressure plate 23 abuts the base of the graphite ring 21 and presses the ring 21 upwards so that correspondingly conical faces on the ring 21 and on the packing ring 22 abut. The packing ring 22 is secured to the closure cap 20 by welding 27.

In the event of fire within the pipe line, the heat-destructible spacer ring 24 disintegrates, so that the springs 25 expand and push the pressure plate 23 upwards, and the latter presses the graphite ring 21 into tight sealing engagement with the packing ring 22 and the control shaft 6, this action being assisted by the fluid pressure in the pipeline. The space between the ring 22 and the shaft 6 is thus sealed against the escape of fire therebetween, as is shown in FIG. 5.

With reference to FIG. 6, a graphite ring 28 is provided between the trunnion 5, the portion 1A of the valve body in which the trunnion is located, and a support ring 29. The latter is secured to the body portion 1A by bolts 30, and the trunnion 5 has a shoulder 5A abutting the ring 29, and an end portion engaging in a hole in the ring.

The graphite ring 28 is located in an annular recess 31 in the body portion 1A, and is initially of rectangular section, and is compressed to the sectional shape shown in FIG. 6 during assembly of the valve. For this purpose, the portion of the trunnion surrounded by the recess 31 and the ring 28 has its diameter increased so that it projects into the recess, the said portion being first cylindrical and then conically tapered upwards.

In the event of fire within the pipe line, though the O-ring 32 disintegrates as shown in FIG. 7, the graphite ring 28 provides a tight seal against the escape of fire between the trunnion and the body.

Figure 8:
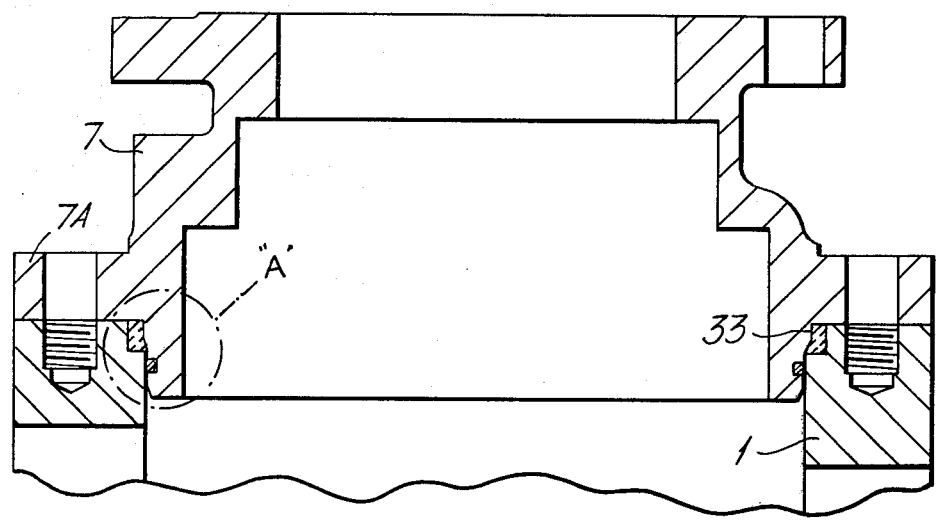
FIG. 8 is a sectional view of a portion of the valve body, including an adaptor.
Figure 9:
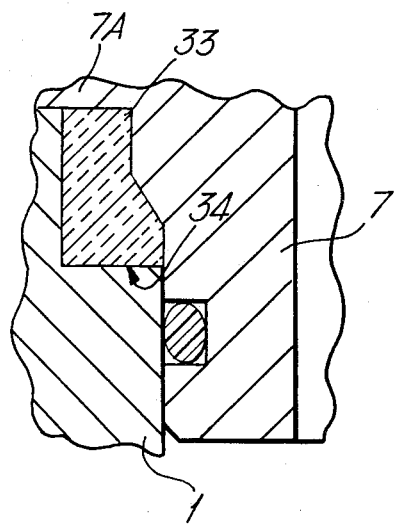
FIG. 9 is a view of the portion within the ring A in FIG. 8, to a larger scale.
Figure 10:
FIG. 10 is a detail sectional view.

With reference to FIGS. 8, 9 and 10, a graphite ring 33 is provided between each adaptor 7 and the valve body 1 to form a fire-tight seal therebetween. The ring 33 is initially of rectangular section, as shown in FIG. 10, and is located in an annular recess 34 in the body 1. When the adaptor is bolted to the body, the ring is compressed to the shape shown in Fig. 9 so that it forms a tight seal. For this purpose, the part of the adaptor which fits into the body has a portion of increased diameter which projects into the recess 34 to compress the graphite. The said portion of increased diameter has, in the direction of fitment of the adaptor, a leading conically tapered face and a trailing circular face, at its outer end, the graphite ring is abutted by the flange 7A of the adaptor 7.

Instead of graphite, other suitable materials may be used which are not destroyed by fire, are compressible, and have a low co-efficient of friction.

The springs 9 and 25 and the sockets 10 and 26 may be replaced respectively by Belleville springs or similar spring means and by annular sockets in which the latter are located.

I claim:

1. A ball valve, especially for use between adjacent sections of a pipe line conducting an inflammable fluid, said ball valve comprising a valve housing, a valve ball in said housing and having a through-passage, a trunnion in said housing projecting into a first socket in said ball, a control shaft projecting into and drivingly engaging a second socket in said ball diametrally opposed to said first socket, a pair of annular valve seat members spaced axially of the pipe line and carrying heat-destructible sealing rings, and spring means urging said seat members into sealing engagement with the ball; in which each seat member, at its end adjacent the spring means has a frusto-conical portion which tapers from a shoulder on the seat member towards the end face of the latter, a graphite ring is fitted between said frusto-conical portion and the adjacent peripheral wall of the housing, a first heat-destructible spacer ring is located between said graphite ring and said shoulder, an annular pressure plate is located between the end face of the seat member and the spring means and is abutted by the latter and has an annular lip abutting the graphite ring, and a second heat-destructible spacer ring is located between the end face of the seat member and said pressure plate; whereby, in the event of fire in a pipe line on the upstream side of the valve, the sealing ring and said spacer rings on the upstream seat member disintegrate, the spring means pushes the seat member into metal-to-metal sealing contact with the ball, and pushes the pressure plate relative to the seat member so that the lip on the pressure plate pushes the graphite ring along the frusto-conical portion towards the shoulder so that the graphite ring becomes tightly wedged between the frusto-conical portion and the adjacent peripheral wall of the housing and seals the clearance passage therebetween against the spread of fire therealong.

2. A ball valve according to claim 1, wherein the control shift extends outwardly of the housing through an opening in a closure cap secured to the housing, the opening in the closure cap having a wider diameter wall extending outwardly of the housing from a shoulder of the closure cap so as to provide an annular space around the control shaft, a metal packing ring being welded to the said wall and having an end face disposed towards the housing, a cylindrical inner wall extending outwardly of the housing from the end face and a frusto-conical inner wall tapering from the cylindrical inner wall outwardly of the housing, an annular pressure plate disposed in a sense axially of the control shaft, between spring means urging the pressure plate towards the packing ring and a heat-destructible spacer ring disposed on the end face of the metal packing ring, and, in a sense radially of the control shaft, between the control shaft and the said wider diameter wall, the annular pressure plate having an annular boss extending into the space between the control shaft and the said inner cylindrical wall and pressing a graphite ring between the control shaft and the metal packing ring into abutment with the said frusto-conical inner wall, whereby, in the event of fire, the spacer ring disintegrates so as to allow the annular pressure plate to be pressed further by the spring means and cause the annular boss to push the graphite ring further along the frusto-conical inner wall so that the graphite ring becomes tightly wedged between the frusto-conical inner wall and the control shaft and seals the clearance passage therebetween against the spread of fire therealong.

* * * * *